(12) United States Patent
Kim et al.

(10) Patent No.: US 12,157,407 B2
(45) Date of Patent: Dec. 3, 2024

(54) APPARATUS FOR ROTATING A HEADREST OF A VEHICLE SEAT

(71) Applicants: HYUNDAI MOTOR COMPANY, Seoul (KR); KIA CORPORATION, Seoul (KR)

(72) Inventors: Bong Ku Kim, Seoul (KR); Sang Do Park, Suwon-si (KR); Hoon Bok Lee, Hwaseong-si (KR); Mu Young Kim, Osan-si (KR); Chan Ho Jung, Gunpo-si (KR); Deok Soo Lim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 155 days.

(21) Appl. No.: 17/941,839

(22) Filed: Sep. 9, 2022

(65) Prior Publication Data
US 2023/0084542 A1 Mar. 16, 2023

(30) Foreign Application Priority Data
Sep. 14, 2021 (KR) .................. 10-2021-0122209

(51) Int. Cl.
*B60N 2/862* (2018.01)
*B60N 2/809* (2018.01)
*B60N 2/847* (2018.01)
*B60N 2/853* (2018.01)

(52) U.S. Cl.
CPC ............ *B60N 2/862* (2018.02); *B60N 2/809* (2018.02); *B60N 2/847* (2018.02); *B60N 2/853* (2018.02)

(58) Field of Classification Search
CPC ........ B60N 2/865; B60N 2/897; B60N 2/862; A47C 1/10
See application file for complete search history.

(56) References Cited

U.S. PATENT DOCUMENTS

| | | | |
|---|---|---|---|
| 5,816,658 A * | 10/1998 | Wallis | B60N 2/815 297/391 |
| 5,938,279 A * | 8/1999 | Schubring | B60N 2/838 297/216.12 |
| 2017/0113578 A1* | 4/2017 | Shiraishi | B60N 2/80 |
| 2021/0053475 A1* | 2/2021 | Nacy | B60N 2/862 |

* cited by examiner

*Primary Examiner* — David R Dunn
*Assistant Examiner* — Tania Abraham
(74) *Attorney, Agent, or Firm* — Lempia Summerfield Katz LLC (57) ABSTRACT

An apparatus for rotating a headrest of a vehicle seat includes a headrest that is rotated forward to support a seat occupant's head upon reclining of a seatback. A seat occupant's head is comfortably supported by the headrest and a comfortable relaxation posture is implemented.

20 Claims, 6 Drawing Sheets

APPARATUS FOR ROTATING A HEADREST OF A VEHICLE SEAT

CROSS-REFERENCE TO RELATED APPLICATION

This application claims under 35 U.S.C. § 119(a) the benefit of priority to Korean Patent Application No. 10-2021-0122209, filed on Sep. 14, 2021, the entire contents of which are incorporated herein by reference.

BACKGROUND

(a) Technical Field

The present disclosure relates to an apparatus for rotating a headrest of a vehicle seat. More particularly, it relates to an apparatus for rotating a headrest of a vehicle seat by which the headrest is capable of being rotated forwards when a seatback is reclined.

(b) Background Art

Generally, a seat for a vehicle includes a seat cushion on which a seat occupant's lower body is seated, a seatback on which a seat occupant's upper body leans, and a headrest for supporting the neck and head of the seat occupant.

Recently, for relaxation tailored to a seat occupant's body type and situation, a seat mechanism or the like to realize a comfortable relaxation posture has been applied to a seat.

The comfortable relaxation posture may be implemented by a combination of an operation of reclining a seatback, an operation of tilting a seat cushion, and an operation of deploying a headrest.

Here, the operation flow of reclining a seatback for implementing the comfortable relaxation posture is described below with reference to FIG. 1A and FIG. 1B of the related art.

Figure 1A:
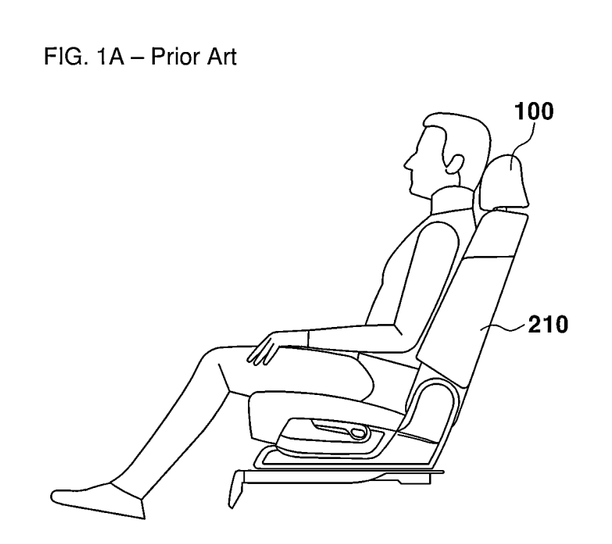
FIG. 1A is a side view illustrating the state before a seatback is reclined of the related art.

As illustrated in FIG. 1A, in the state in which a seatback 210 is in a standard position in which reclining is not performed, a seat occupant's head may be easily supported by a headrest 100.

Figure 1B:
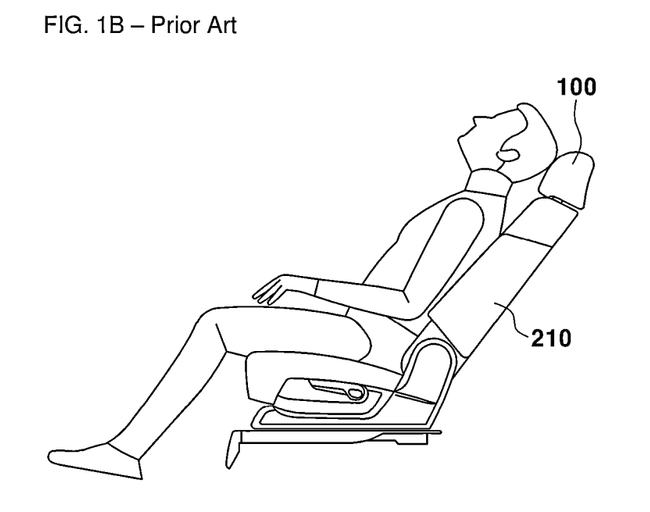
FIG. 1B is a side view illustrating the state after a seatback is reclined of the related art.

Here, when the seat occupant manipulates a reclining operation lever 130 in an unlocking direction and presses the seatback 210 rearwards using the seat occupant's upper body, the seatback 210 may be inclined rearwards, as illustrated in FIG. 1B.

However, since the position of the headrest supporting the seat occupant's head is fixed without changing during the reclining of the seatback, the seat occupant may feel uncomfortable with his or her head and neck tilted excessively back.

In other words, the seat occupant may feel comfortable as if his or her upper body were lying down due to the reclining of the seatback. However, because the position of the headrest is maintained in a fixed state, the head of the seat occupant feels uncomfortable, as if the head were resting without a pillow.

The above information disclosed in this Background section is only to enhance understanding of the background of the disclosure. Therefore, the Background section may contain information that does not form the prior art that is already known in this country to a person of ordinary skill in the art.

SUMMARY

The present disclosure has been made in an effort to solve the above-described problems associated with the prior art.

Accordingly, it is an object of the present disclosure to provide an apparatus for rotating a headrest of a vehicle seat. The apparatus is configured to rotate the headrest forwards to support a seat occupant's head upon reclining of a seatback so as to comfortably support the seat occupant's head as if the head were resting on a pillow, cushion, or the like.

In one aspect, the present disclosure provides an apparatus for rotating a headrest of a vehicle seat. The apparatus includes a headrest support frame mounted on a seatback frame, a pair of stay guide pipes into which stays of a headrest are inserted to be movable upwards and downwards, and a hinge device. The hinge device is mounted between the headrest support frame and the stay guide pipe and configured to rotate the stay guide pipe forwards and rearwards. Further, the apparatus includes a latch device mounted on the hinge device to lock or unlock the stay guide pipe and a reclining operation lever mounted on a side portion of a seat cushion to recline the seatback frame. The apparatus also includes a first cable connecting the seatback frame to the hinge device and configured to rotate the stay guide pipe forwards while being pulled during reclining of the seatback frame. The apparatus also includes a second cable connecting the reclining operation lever to the latch device and configured to unlock the latch device while being pulled when the reclining operation lever is lifted.

In another embodiment, the hinge device may include support pipes mounted on the pair of stay guide pipes and a first hinge bracket and a second hinge bracket mounted on the headrest support frame so as to be spaced apart from each other in a leftward and rightward direction. The hinge device may further include a hinge pipe that connects the support pipes and that is rotatably inserted into the first hinge bracket and the second hinge bracket. The hinge device may also include a first rotating plate rotatably located on an outer side of the first hinge bracket and connected to one end of the hinge pipe and connected to a remaining end of the first cable so as to be rotated forwards when the first cable is pulled.

In another embodiment, a first return spring may be mounted between the first rotating plate and the first hinge bracket. The first return spring may be configured to provide an elastic restoring force to rotate the first rotating plate to an original position thereof.

In still another embodiment, the first cable may have one end connected to a fixed frame to which the seatback frame is reclinably coupled.

In yet another embodiment, a section between one end and a remaining end of the first cable may be mounted on a rear surface portion of the seatback frame.

In still yet another embodiment, the latch device may include a toothed gear mounted on a hinge pipe of the hinge device and a locking pin rotatably disposed at an inner side of a second hinge bracket of the hinge device and lockably engaged with the toothed gear. The latch device may further include a second rotating plate rotatably disposed on an outer side of the second hinge bracket. The second rotating plate may be coaxially connected to the locking pin and connected to a remaining end of the second cable so as to be rotated in an unlocking direction of the locking pin when the second cable is pulled.

In a further embodiment, a second return spring may be mounted between the second rotating plate and the second hinge bracket. The second return spring may be configured to provide an elastic restoring force to rotate the second rotating plate to an original position thereof.

In another further embodiment, the second cable may have one end connected to a rear upper surface portion of a rotating center of the reclining operation lever.

Other aspects and embodiments of the disclosure are discussed hereinbelow.

It is understood that the term "vehicle" or "vehicular" or other similar terms as used herein are inclusive of motor vehicles in general. Such motor vehicles may include passenger automobiles including sports utility vehicles (SUV), buses, trucks, various commercial vehicles, watercraft including a variety of boats and ships, aircraft, and the like. Such vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the disclosure are discussed hereinbelow.

BRIEF DESCRIPTION OF THE DRAWINGS

The above and other features of the present disclosure are now described in detail with reference to certain embodiments thereof illustrated in the accompanying drawings, which are given hereinbelow by way of illustration only. Thus, such features are not limited to the accompanying drawings and the described embodiments of the present disclosure, wherein.

It should be understood that the appended drawings are not necessarily to scale, presenting a somewhat simplified representation of various features illustrative of the basic principles of the disclosure. The specific design features of the present inventive concept as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference is now be made in detail to various embodiments of the present disclosure, examples of which are illustrated in the accompanying drawings and described below. While the disclosure is described in conjunction with specific embodiments, it should be understood that the present description is not intended to limit the disclosure to those embodiments. On the contrary, the disclosure is intended to cover not only the described embodiments, but also various alternatives, modifications, equivalents, and other embodiments, which may be included within the spirit and scope of the inventive concept as defined by the appended claims. When a component, device, element, or the like of the present disclosure is described as having a purpose or performing an operation, function, or the like, the component, device, or element should be considered herein as being "configured to" meet that purpose or to perform that operation or function.

Figure 2:
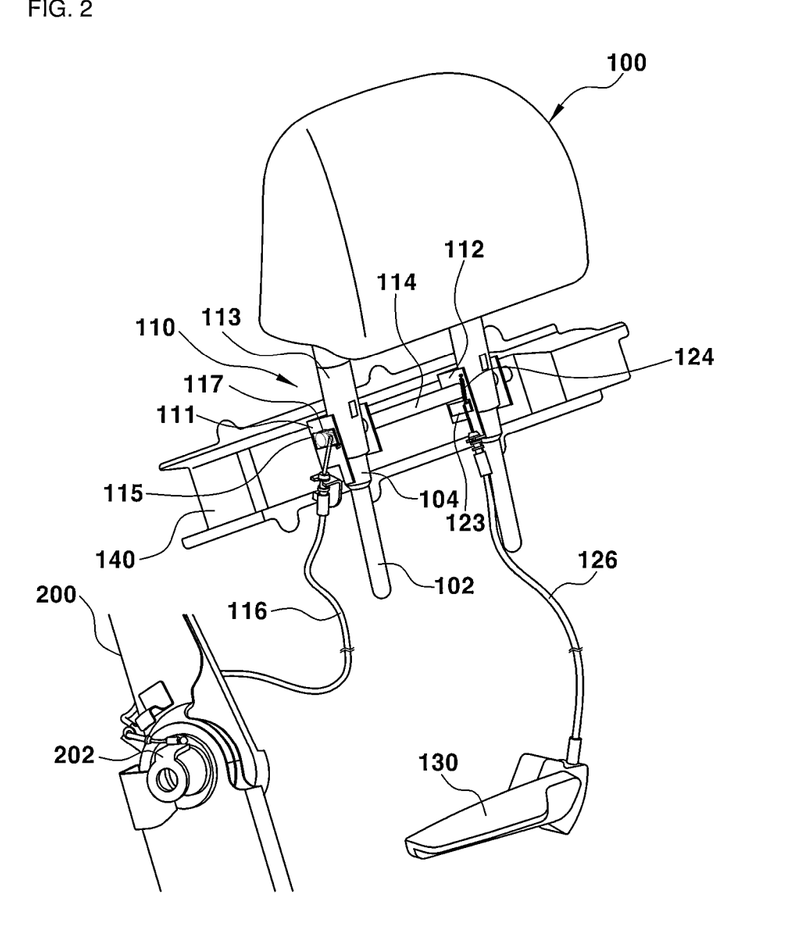
FIG. 2 is a perspective view illustrating an apparatus for rotating a headrest of a vehicle seat according to the present disclosure.

FIG. 2 is a perspective view illustrating an apparatus for rotating a headrest of a vehicle seat according to the present disclosure.

As illustrated in FIG. 2, a lower portion of a headrest 100 is provided with a pair of stays 102 protruding therefrom. Each of the stays 102 is inserted into a stay guide pipe 104 to be movable upwards and downwards.

A headrest support frame 140, configured to mount the headrest 100, is mounted on an upper end of a seatback frame 200 by welding or the like.

For forward and rearward rotation of the headrest 100, a hinge device 110, configured to rotate the stay guide pipe 104 forward and rearward, is mounted between the headrest support frame 140 and the stay guide pipe 104.

For this, the hinge device 110 includes support pipes 113, each mounted on an outer diameter portion of the stay guide pipe 104, and includes a first hinge bracket 111 and a second hinge bracket 112. The first hinge bracket 111 and the second hinge bracket 112 are mounted on a front portion of the headrest support frame 140 so as to be spaced apart from each other in a leftward and rightward direction. The hinge device 110 also includes a hinge pipe 114 connecting the support pipes 113 and arranged horizontally with the opposite ends thereof being rotatably inserted into the first hinge bracket 111 and the second hinge bracket 112, respectively.

In addition, a first rotating plate 115, connected to one end of the hinge pipe 114, is disposed so as to be rotatable in a forward-rearward direction on an outer side of the first hinge bracket 111.

The first rotating plate 115 is provided in a rectangular plate structure and the rear end portion thereof is preferably connected to the hinge pipe 114.

Here, a first cable 116, configured to rotate the stay guide pipe 104 forwards while being pulled during reclining of the seatback frame 200, connects the seatback frame 200 and the hinge device 110.

One end of the first cable 116 may be connected to a fixed frame 202 to which the seatback frame 200 is reclinably coupled. The other end of the first cable 116 may be connected to a front end portion of the first rotating plate 115.

For reference, the fixed frame 202 is a frame that is integrally connected with a seat cushion frame and does not move. In addition, a lower end of the seatback frame 200 is rotatably coupled for forward movement and inclining.

Here, a section between the one end and the other end of the first cable 116 is mounted so as to be closely adhered to a rear surface portion of the seatback frame 200.

Accordingly, the section between the one end and the other end of the first cable 116 is pushed back during reclining of the seatback frame 200, whereby the tension of the first cable 116 is increased, thus pulling the other end of the first cable 116. Thereafter, the front end portion of the first rotating plate 115, which is connected to the other end of the first cable 116, rotates downward.

At the same time, the hinge pipe 114, connected to a rear end portion of the first rotating plate 115, rotates forward by the angle at which the front end portion of the first rotating plate 115 rotates downward. The support pipe 113 and the stay guide pipe 104, which are connected to the hinge pipe 114, rotate forwards by the same angle.

As a result, since the stay 102 of the headrest 100 is in a state of being inserted into the stay guide pipe 104, the headrest 100 rotates forward upon forward rotation of the stay guide pipe 104. Accordingly, a seat occupant's head is supported by the forwardly rotated headrest 100 as if the head were resting on a pillow.

Meanwhile, in order for the headrest 100 to return to its original position after being rotated forward, a first return spring 117, configured to provide elastic restoring force to rotate the first rotating plate 115 to its original position, connects the first rotating plate 115 to the first hinge bracket 111.

According to the present disclosure, when the seatback is not reclined, the headrest 100 is maintained in a locked state to constrain movement of the headrest 100. Further, when the seatback is reclined, the headrest 100 is unlocked so as to be rotated forwards.

To this end, in order to constrain the forward and rearward rotation of the headrest 100, a latch device 120, configured to lock or unlock the stay guide pipe 104, is mounted on the hinge device 110.

Figure 3:
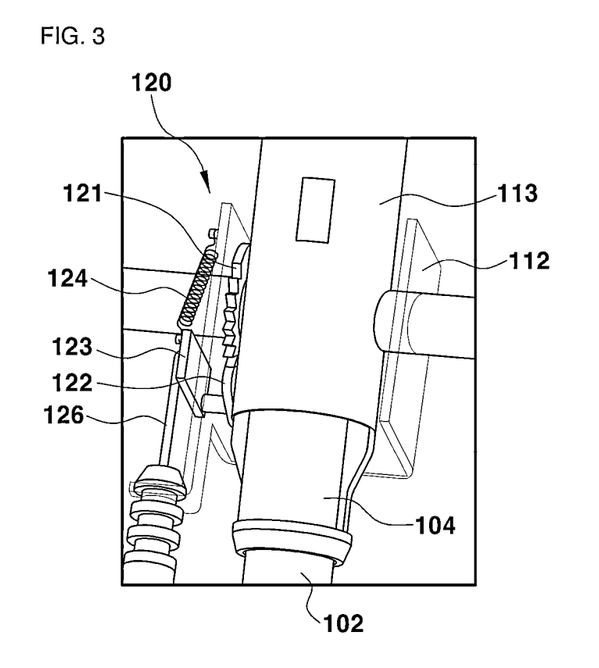
FIG. 3 is an enlarged perspective view illustrating a main part of a latch device of an apparatus for rotating a headrest of a vehicle seat according to the present disclosure.

FIG. 3 is an enlarged perspective view illustrating a main part of a latch device of an apparatus for rotating a headrest of a vehicle seat according to the present disclosure.

As illustrated in FIG. 3, the latch device 120 includes a toothed gear 121 mounted on the hinge pipe 114 of the hinge device 110 and includes a locking pin 122. The locking pin 122 is rotatably disposed at an inner side of the second hinge bracket 112 of the hinge device 110 and lockably engaged with the toothed gear 121. The latch device further includes a second rotating plate 123 that is rotatably disposed on an outer side of the second hinge bracket 112 and coaxially connected to the locking pin 122.

Because the second rotating plate 123 is provided in a rectangular plate structure, a rear end portion thereof may be connected to the hinge pipe 114.

Here, a second cable 126 connects the latch device 120 to a reclining operation lever 130. The second cable 126 is configured to unlock the latch device while being pulled when the reclining operation lever 130 is lifted.

One end of the second cable 126 may be connected to a rear upper surface portion of a rotating center of the reclining operation lever 130. The other end of the second cable 126 may be connected to a front end portion of the second rotating plate 123.

For reference, in order to recline the seatback frame 200, a known reclining device is mounted at a connection point between the seatback frame and the seat cushion frame. In addition, a known reclining operation lever 130 for unlocking the reclining device is mounted so as to be liftable upward on a side portion of the seat cushion. A mechanism for reclining the reclining device is a well-known technique for those having ordinary skill in the art, and a detailed description thereof has been omitted.

Accordingly, the one end of the second cable 126 is connected to the rear upper surface portion of the rotating center of the reclining operation lever 130. Thus, when a seat occupant holds the reclining operation lever 130 and lifts the same upward, i.e., in the direction for unlocking the reclining device, the one end of the second cable 126 moves downward to thereby pull the other end of the second cable 126 downward.

Then, the front end portion of the second rotating plate 123 connected to the other end of the second cable 126 is rotated downward. Accordingly, the locking pin 122, coaxially connected to the second rotating plate 123, is rotated downward. The rotation downward allows the locking pin 122 to be separated from the toothed gear 121 to thereby unlock the latch device 120.

As described above, the hinge pipe 114 is in a rotatable state according to the unlocking of the latch device 120. The stay guide pipe 104 and the headrest 100 are also rotatable forwards and rearwards.

Meanwhile, when the seat occupant releases the reclining operation lever 130, the locking pin 122 is lockably inserted into the toothed gear 121 again when the second rotating plate 123 returns to its original position.

A second return spring 124, configured to provide an elastic restoring force to rotate the second rotating plate 123 to its original position, is connected to the second rotating plate 123 and to the second hinge bracket 112.

Here, an operation flow of the apparatus for rotating the headrest in the above-described configuration is described sequentially with reference to FIGS. 4-7 as follows.

Figure 4:
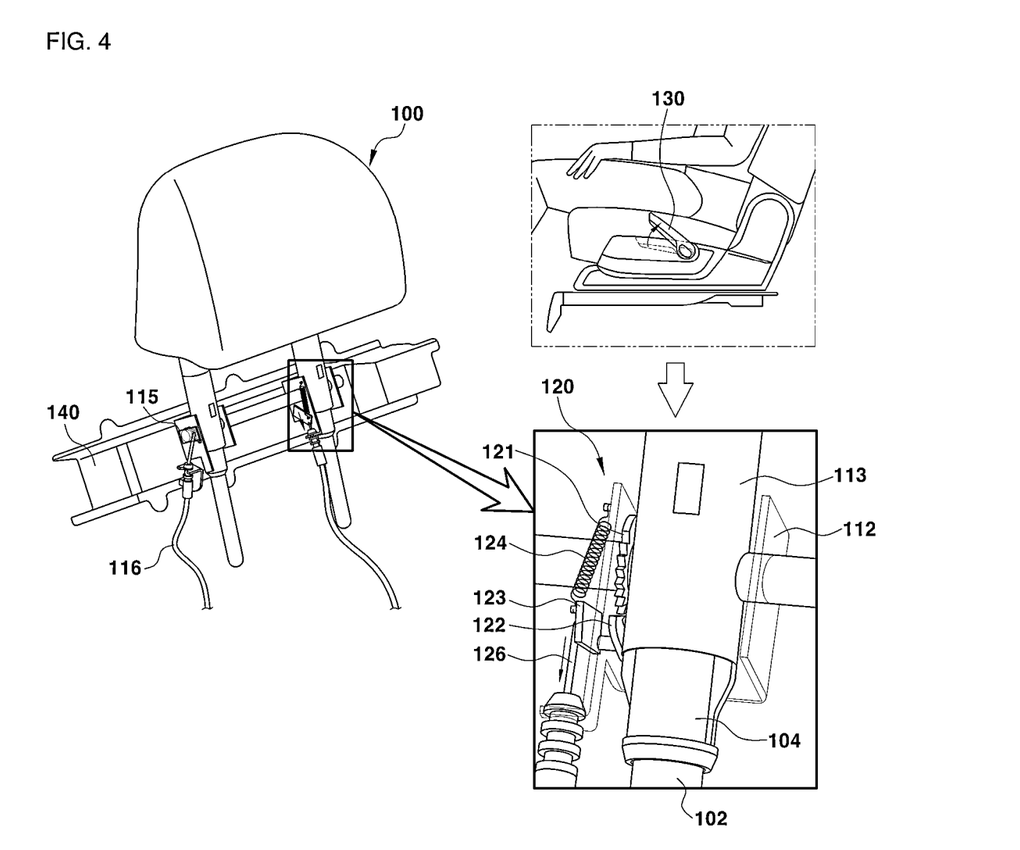
FIG. 4 is a view illustrating an operation of unlocking a latch device of an apparatus for rotating a headrest according to the present disclosure.

FIG. 4 is a view illustrating an operation of unlocking a latch device of the apparatus for rotating the headrest according to the present disclosure.

First, as illustrated in FIG. 4, when an occupant of a seat holds the reclining operation lever 130 and lifts the same upward, i.e., in the direction for unlocking the reclining device, the one end of the second cable 126 moves downward to thereby pull the other end of the second cable 126 downward. Therefore, the front end portion of the second rotating plate 123, which is connected to the other end of the second cable 126, is rotated in a downward direction, i.e., the unlocking direction.

Subsequently, the locking pin 122, which is coaxially connected to the second rotating plate 123, also rotates downward and is separated from the toothed gear 121 to unlock the latch device 120, whereby the hinge pipe 114 is in a rotatable state.

In addition, the support pipe 113 connected to the hinge pipe 114, the stay guide pipe 104 on which the support pipe 113 is mounted, and the headrest 100 provided with the stay 102 inserted into the stay guide pipe 104 are all in a forwardly rotatable state.

Here, when the reclining operation lever 130 is lifted upward, i.e., in the unlocking direction to release the locking of the known reclining device, the seatback is in a rearwardly reclinable state.

Accordingly, when the seat occupant leans back his or her upper body to transmit a rearward force to the seatback, reclining is performed in which the seatback 210 is tilted rearward.

Figure 5:
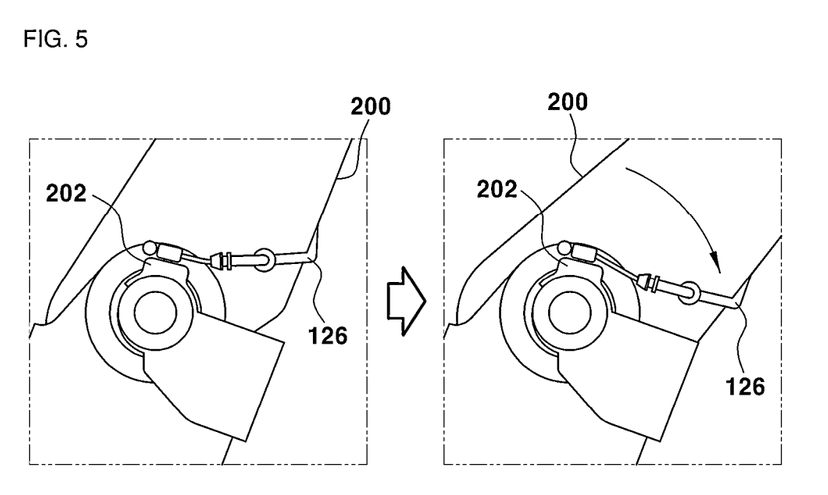
FIG. 5 is a side view illustrating an operation of a first cable being pulled upon reclining of a seatback after unlocking a latch device of an apparatus for rotating a headrest according to the present disclosure.

In addition, after the latch device 120 is unlocked, the first cable 116 is pulled when the seatback 210 is reclined.

More specifically, when the seatback 210 is reclined, the section between the one end and the other end of the first cable 116 is pushed back by the seatback frame 200, as illustrated in FIG. 5, to thereby increase the tension of the first cable 116. Therefore, the other end of the first cable 116 is pulled downward, i.e., in the unlocking direction.

Figure 6:
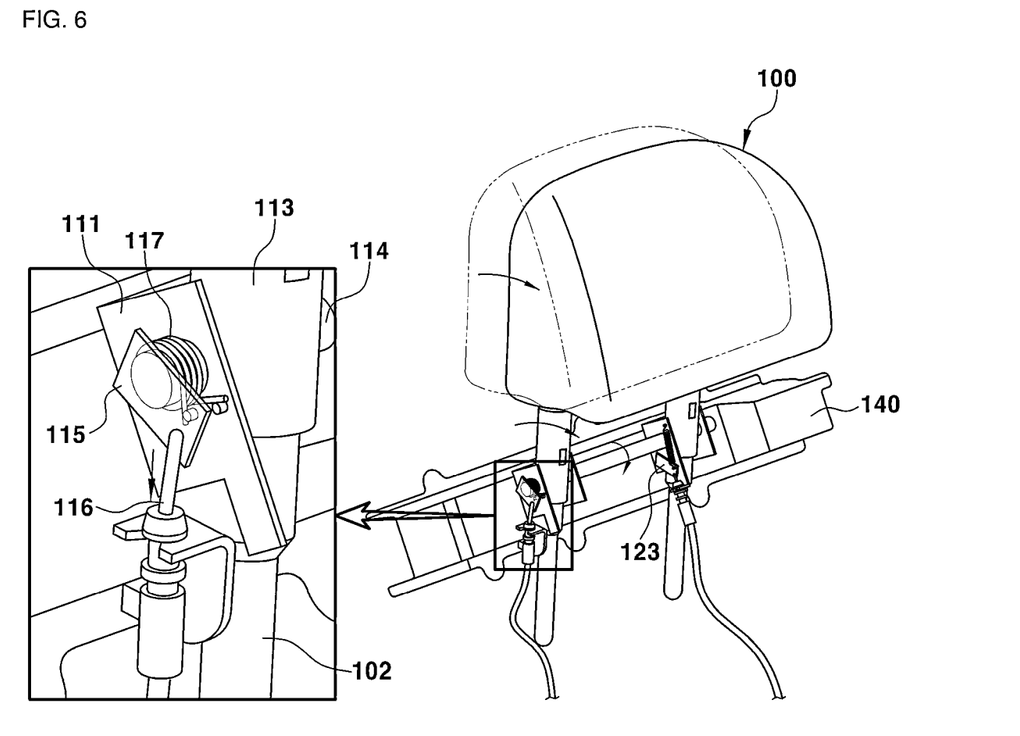
FIG. 6 is a perspective view illustrating an operation of a headrest being rotated forwards by an operation of pulling a first cable upon reclining of a seatback after unlocking a latch device of an apparatus for rotating a headrest according to the present disclosure.

Subsequently, when the other end of the first cable 116 is pulled downward, the front end portion of the first rotating plate 115, which is connected to the first cable 116, rotates downward, as illustrated in FIG. 6.

At the same time, the hinge pipe 114, connected to a rear end portion of the first rotating plate 115, rotates forward by the angle at which the front end portion of the first rotating plate 115 rotates downward. The support pipe 113 and the stay guide pipe 104, which are connected to the hinge pipe 114, rotate forward by the same angle, as illustrated in FIG. 6.

As a result, since the stay 102 of the headrest 100 is in a state of being inserted into the stay guide pipe 104, the headrest 100 rotates forward upon forward rotation of the stay guide pipe 104. As such, a seat occupant's head is supported by the forwardly rotated headrest 100 as if the head were resting on a pillow.

Meanwhile, when the seat occupant releases the reclining operation lever 130, the locking pin 122 is inserted into the toothed gear 121 to be locked again while the second rotating plate 123 is returned to its original position by the elastic restoring force of the second return spring 124. In this state, the headrest 100 is fixed at a position where the headrest 100 is rotated forward.

Figure 7:
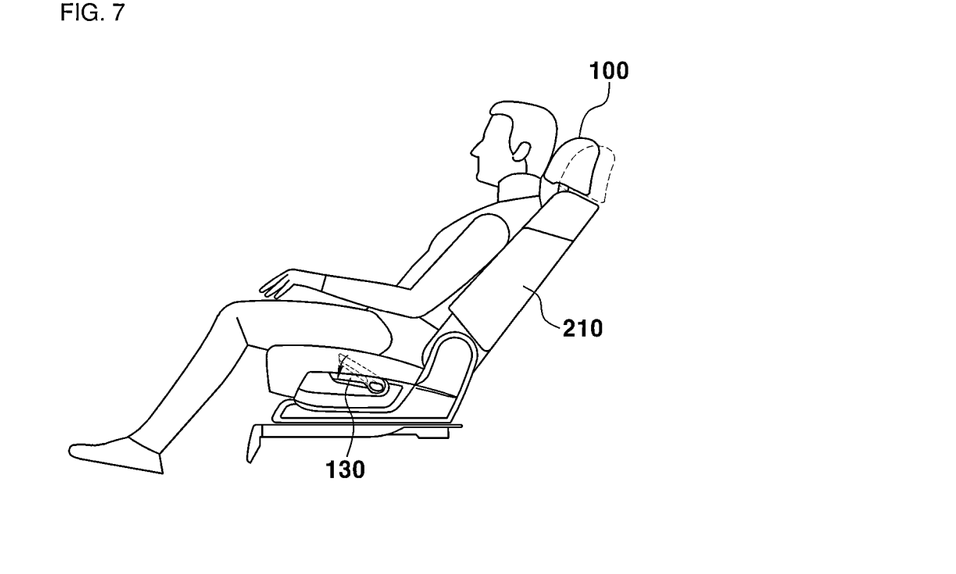
FIG. 7 is a side view illustrating the state in which a headrest is rotated forwards upon reclining of a seatback by an apparatus for rotating a headrest according to the present disclosure.

Therefore, as illustrated in FIG. 7, since the headrest 100 is rotated forward by the operation of reclining the seatback 210, the seat occupant may feel comfortable as if he or she were lying down due to the reclining of the seatback. At the same time, because the seat occupant's head is supported by the forwardly rotated headrest, the seat occupant may feel comfortable as if his or her head were resting on a pillow.

As is apparent from the above description, the present disclosure provides the following effects.

First, a seat occupant's head can be comfortably supported as if it were resting on a pillow by allowing a headrest to rotate forward to support the seat occupant's head during reclining of a seatback.

Second, even without mounting a separate headrest cushion or the like on the headrest, convenience can be provided in which the seat occupant's head is supported as if it were resting on a pillow when a comfortable relaxation posture is implemented.

The inventive concept of the present disclosure has been described in detail with reference to embodiments thereof. However, it should be appreciated by those having ordinary skill in the art that changes may be made in these embodiments without departing from the principles and spirit of the disclosure, the scope of which is defined in the appended claims and equivalents thereto.

What is claimed is:

1. An apparatus for rotating a headrest of a vehicle seat, the apparatus comprising:
 a headrest support frame mounted on a seatback frame;
 a pair of stay guide pipes into which stays of a headrest are inserted so as to be movable upward and downward;
 a hinge device mounted between the headrest support frame and the pair of stay guide pipes and configured to rotate the pair of stay guide pipes forward and rearward;
 a latch device mounted on the hinge device to lock or unlock the pair of stay guide pipe;
 a reclining operation lever mounted on a side portion of a seat cushion to recline the seatback frame;
 a first cable connecting the seatback frame to the hinge device; and
 a second cable connecting the reclining operation lever to the latch device,
 wherein the hinge device includes
  a pair of support pipes each mounted on the pair of stay guide pipes,
  a first hinge bracket and a second hinge bracket mounted on the headrest support frame so as to be spaced apart from each other in a leftward and rightward direction,
  a hinge pipe connecting the pair of support pipes and rotatably inserted into the first hinge bracket and the second hinge bracket, and
  a first rotating plate rotatably located on an outer side of the first hinge bracket, connected to one end of the hinge pipe, and connected to a distal end of the first cable so as to be rotated forward when the first cable is pulled.

2. The apparatus of claim 1, wherein a first return spring is mounted between the first rotating plate and the first hinge bracket, the first return spring configured to provide an elastic restoring force to rotate the first rotating plate to an original position thereof.

3. The apparatus of claim 1, wherein the first cable has a proximal end connected to a fixed frame to which the seatback frame is reclinably coupled.

4. The apparatus of claim 1, wherein a section between a proximal end and a distal end of the first cable is mounted on a rear surface portion of the seatback frame.

5. The apparatus of claim 1, wherein the latch device comprises:
 a toothed gear mounted on the hinge pipe of the hinge device;
 a locking pin rotatably disposed at an inner side of the second hinge bracket of the hinge device and lockably engaged with the toothed gear; and
 a second rotating plate rotatably disposed on an outer side of the second hinge bracket, coaxially connected to the locking pin, and connected to a remaining end of the second cable so as to be rotated in an unlocking direction of the locking pin when the second cable is pulled.

6. The apparatus of claim 5, wherein a second return spring is mounted between the second rotating plate and the second hinge bracket, the second return spring configured to provide an elastic restoring force to rotate the second rotating plate to an original position thereof.

7. The apparatus of claim 1, wherein the second cable has one end connected to a rear upper surface portion of a rotating center of the reclining operation lever.

8. The apparatus of claim 1, wherein the first cable rotates the stay guide pipe forward while being pulled during reclining of the seatback frame.

9. The apparatus of claim 1, wherein the second cable unlocks the latch device while being pulled when the reclining operation lever is lifted.

10. An apparatus for rotating a headrest of a vehicle seat, the apparatus comprising:
 a headrest support frame mounted on a seatback frame;
 a pair of stay guide pipes into which stays of a headrest are inserted so as to be movable upward and downward;

a hinge device mounted between the headrest support frame and the pair of stay guide pipes and configured to rotate the pair of stay guide pipes forward and rearward;

a latch device mounted on the hinge device to lock or unlock the pair of stay guide pipe;

a reclining operation lever mounted on a side portion of a seat cushion to recline the seatback frame;

a first cable connecting the seatback frame to the hinge device; and a second cable connecting the reclining operation lever to the latch device, wherein the second cable has one end connected to a rear upper surface portion of a rotating center of the reclining operation lever.

11. An apparatus for rotating a headrest of a vehicle seat, the apparatus comprising:

a headrest support frame mounted on a seatback frame;

a pair of stay guide pipes into which stays of a headrest are inserted so as to be movable upward and downward;

a hinge device mounted between the headrest support frame and the pair of stay guide pipes and configured to rotate the pair of stay guide pipes forward and rearward;

a latch device mounted on the hinge device to lock or unlock the pair of stay guide pipes;

a reclining operation lever mounted on a side portion of a seat cushion to recline the seatback frame;

a first cable connecting the seatback frame to the hinge device; and a second cable connecting the reclining operation lever to the latch device, wherein the hinge device includes a first hinge bracket and a second hinge bracket mounted on the headrest support frame so as to be spaced apart from each other in a leftward and a rightward direction, and wherein the latch device includes a toothed gear mounted on a hinge pipe of the hinge device and includes a locking pin rotatably disposed at an inner side of the second hinge bracket of the hinge device and lockably engaged with the toothed gear.

12. The apparatus of claim 11, wherein the hinge device further comprises:

a pair of support pipes each mounted on the pair of stay guide pipes;

the hinge pipe connecting the pair of support pipes and rotatably inserted into the first hinge bracket and the second hinge bracket; and a first rotating plate rotatably located on an outer side of the first hinge bracket, connected to one end of the hinge pipe, and connected to a distal end of the first cable so as to be rotated forward when the first cable is pulled.

13. The apparatus of claim 12, wherein a first return spring is mounted between the first rotating plate and the first hinge bracket, and wherein the first return spring is configured to provide an elastic restoring force to rotate the first rotating plate to an original position thereof.

14. The apparatus of claim 12, wherein the latch device further comprises:

a second rotating plate rotatably disposed on an outer side of the second hinge bracket, coaxially connected to the locking pin, and connected to a remaining end of the second cable so as to be rotated in an unlocking direction of the locking pin when the second cable is pulled.

15. The apparatus of claim 14, wherein a second return spring is mounted between the second rotating plate and the second hinge bracket, and wherein the second return spring is configured to provide an elastic restoring force to rotate the second rotating plate to an original position thereof.

16. The apparatus of claim 11, wherein the first cable has a proximal end connected to a fixed frame to which the seatback frame is reclinably coupled.

17. The apparatus of claim 11, wherein a section between a proximal end and a distal end of the first cable is mounted on a rear surface portion of the seatback frame.

18. The apparatus of claim 11, wherein the second cable has one end connected to a rear upper surface portion of a rotating center of the reclining operation lever.

19. The apparatus of claim 11, wherein the first cable rotates the stay guide pipe forward while being pulled during reclining of the seatback frame.

20. The apparatus of claim 11, wherein the second cable unlocks the latch device while being pulled when the reclining operation lever is lifted.

* * * * *